UNITED STATES PATENT OFFICE

2,414,008
PRODUCTION OF CHLORANIL

Francis N. Alquist and Claude H. Groom, Jr., Midland, Mich., and Frederick H. Haney, Brookfield, Ill., assignors to The Dow Chemical Company, Midland, Mich., a corporation of Michigan No Drawing. Application February 14, 1944, Serial No. 522,404

18 Claims. (Cl. 260—396)

This invention concerns an improved method for the production of chloranil, i. e., tetrachloro-quinone, directly from certain polychloro-phenols.

It is known that chloranil may be produced directly from polychloro-phenols, such as tri-chloro-, tetrachloro-, or pentachloro-phenol, by forming an anhydrous mixture of such polychloro-phenol with several parts by weight of chlorosulphonic acid, or of a mixture of oleum and chlorosulphonic acid, heating the mixture to a reaction temperature of 80° C. or higher and passing chlorine into the mixture. Usually a chlorination catalyst, e. g., ferric chloride, is added prior to the reaction. Although the function of the chlorosulphonic acid has not adequately been explained, Schuloff et al., Chem-Zeit No. 58, pages 569–570 (1932), indicate that the presence of chlorosulphonic acid in considerable amount is important by showing that the yield of chloranil is far higher when the reaction mixture initially contains one part by weight or more of chlorosulphonic acid per mole of the polychlorophenol starting material than when oleum alone is used as a medium for the reaction. In this same article it is also shown that, when using oleum in the reaction, an increase in the sulphur trioxide content of the oleum results in an increase in the yield of chloranil. Apparently, the sulphur trioxide reacts with hydrogen chloride, formed in the chlorination, to produce chlorosulphonic acid in situ.

In the known method just described, one of the oxygen atoms of the chloranil product is, of necessity, supplied by one of the oxygen-containing sulphur compounds present in the reaction mixture. For instance, the chloranil may be formed by a reaction between hexachlorophenol and sulphuric acid in accordance with the equation:

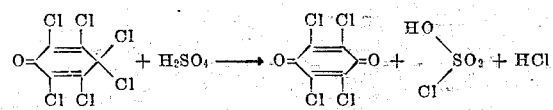

or by a reaction between hexachlorophenol and chlorosulphonic acid in accordance with the equation:

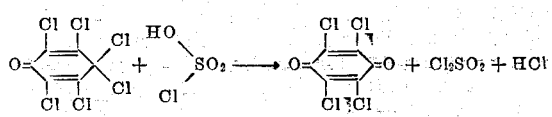

In either instance, one of the oxygen atoms of the chloranil is supplied by an oxygen-containing sulphur compound; hence, such compound is employed both as a reactant for the formation of chloranil and as a medium for the reaction.

Although chloranil may be produced directly and in good yield by the known method just discussed, the method involves operating difficulties which render it poorly suited to commercial practice. During the reaction, volatile sulphur compounds, e. g., sulphur trioxide or sulphuryl chloride, etc., are evolved in large quantities and the handling and disposal of such vapors is troublesome and expensive. The evolved vapors, if contacted with the moisture of the air, produce acids which are highly corrosive to iron or steel apparatus; hence, care must be taken to avoid the occurrence of corrosion. Similarly, the chlorosulphonic acid employed in the process produces corrosive acids if contacted with moisture. Furthermore, the chlorosulphonic acid tends to react violently with water; hence, after completing the reaction, the usual step of diluting the mixture with water preparatory to separating the chloranil product must be carried out slowly and with great care.

We have found that chloranil may be produced directly and in good yield from certain polychloro-phenols, by admixing the latter with concentrated sulphuric acid (not oleum), heating the mixture with agitation to a reaction temperature and passing chlorine into the heated mixture. We have also found that by operating in this way the operating difficulties, inherent in the foregoing usual process, may be avoided. When using concentrated sulphuric acid in the process, the combination of reactions to form chloranil is different from those which occur when oleum or chlorosulphonic acid is used as a reaction medium, i. e., in the present process half of the oxygen atoms in the chloranil product is supplied for the most part by the water in the concentrated sulphuric acid with the result that relatively little, if any, volatile sulphur compounds are formed. In the present process the principal reactions which take place are presumed to be chlorination of the polychlorophenol to form hexachloro-phenol and reaction of the latter with water to produce chloranil. The second of these reactions may be illustrated by the equation:

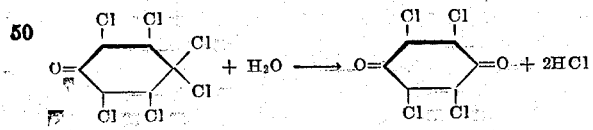

However, we also have found only a limited set of conditions under which concentrated sulphuric acid may satisfactorily be used in the process. Failure to observe any one of these conditions results in a relatively poor yield of chloranil or in other operating difficulties. The reaction conditions which should be observed when using concentrated sulphuric acid in the process are:

1. The polychlorophenol used as a starting material should have an average chlorine content of more than 3, and preferably from 3.5 to 4.5, atoms of chlorine per molecule. This starting material may be an individual polychlorophenol, e. g., tetrachloro-phenol or pentachloro-phenol, but it usually is a mixture of polychloro-phenols which consists for the most part of one or both of the compounds just mentioned. It may comprise minor amounts of lower or more highly chlorinated phenols such as dichloro-, trichloro-, or hexachloro-phenol. The chlorination in the sulphuric acid medium of a chlorinated phenol which initially contains an average of 3 or less chlorine atoms in the molecule is time-consuming and less convenient than chlorination in the absence of such medium to the stage at which the chlorinated phenol product contains more than 3, e. g., from 3.5 to 4.5, chlorine atoms per molecule. Also, it has been observed that the yield of chloranil resulting from the further chlorination of a polychlorophenol in the presence of sulphuric acid decreases as the average chlorine content of the polychloro-phenol starting material is reduced below 3.5, and particularly to only 3 or less, atoms of chlorine per molecule. Polychlorophenol having a chlorine content of from 3.5 to 4.5 atoms of chlorine per molecule is preferably used, since such material may readily be melted and may conveniently be added in molten form to the reaction mixture. Pentachlorophenol, because of its higher melting point, i. e., about 190° C., is not conveniently added in molten form, but instead is pulverized (when obtained in lump form) and is added as a finely divided solid to the sulphuric acid.

2. The concentrated sulphuric acid should be of from 90 to 99.5, preferably from 92 to 99, per cent by weight concentration, i. e., it should contain from 0.5 to 10, and preferably from 1 to 8, per cent by weight of water. As hereinbefore mentioned, the presence of some water is required in order to obtain the chloranil product without the occurrence of an extensive reaction between the chlorinated phenol and sulphuric acid with formation of chlorosulphonic acid in large amount. Even when using concentrated, rather than anhydrous, sulphuric acid as a medium for the reaction a small amount of chlorosulphonic acid may be formed, but the amount formed under these conditions usually corresponds to less than 3 per cent of the weight of the reaction mixture and is not sufficient to cause the aforementioned operating difficulties. The reaction can be carried out in the presence of concentrated sulphuric acid without the formation of chlorosulphonic acid in an appreciable amount. However, it has been found in comparative experiments that the yield of chloranil decreases quite sharply as the concentration of the sulphuric acid employed in the process is decreased below 92 per cent and that it is undesirably low when sulphuric acid of less than 90 per cent concentration is used.

3. The reaction should be carried out for the most part at temperatures between 90° and 130° C. and preferably between 95° and 125° C. At temperatures below 90° C. the reaction to form chloranil occurs sluggishly and may not conveniently be carried to completion. At temperatures above 130° C. objectionable by-products are usually formed in considerable amount at the expense of the desired chloranil product.

4. It is important that the mixture be stirred, ground, or otherwise agitated vigorously during the reaction, since otherwise the reaction tends to stop far short of completion. Both the polychlorophenols and the chloranil product are only sparingly soluble in the concentrated sulphuric acid and apparently the chloranil first formed tends to coat and prevent further reaction of the particles of polychlorophenol unless broken from the latter by agitation of the mixture.

In preparing chloranil in accordance with the invention, polychlorinated phenol having an average chlorine content corresponding to between 3 and 5.5, preferably between 3.5 and 4.5, chlorine atoms per molecule is admixed with sufficient sulphuric acid of concentration between 90 and 99.5, preferably between 92 and 99, per cent by weight to form a slurry or suspension which is sufficiently mobile to permit ready stirring. Usually between 4 and 6 parts by weight of the concentrated sulphuric acid is employed per part of the polychlorinated phenol, but the acid may be used in smaller or greater proportions if desired. When the polychlorinated phenol starting material contains an average of less than 4.5, e. g., from 3.5 to 4.5, chlorine atoms per molecule, it is advantageously melted and added in molten form with stirring to the concentrated sulphuric acid which, preferably, also is heated to above the melting point of the polychlorophenol. When pentachloro-phenol is used as a starting material, it is added in powdered or finely crystalline form to the acid.

The mixture of polychloro-phenol and concentrated sulphuric acid is heated, e. g., to 90–130° C., and chlorine is introduced while stirring the mixture. The chlorination reaction may be started and be continued for some time at temperatures as low as 80–90° C., but in order to obtain chloranil in good yield the reaction is carried to completion at temperatures between 90° and 130° C., preferably between 95° and 125° C. The extent of the reaction may be determined at any time by withdrawing a sample of the reaction mixture and analyzing it for polychloro-phenols and chloranil. In case the reaction ceases far short of completion, it is merely necessary to increase the vigor with which the mixture is being stirred or agitated in order to cause continuance of the reaction. Hydrogen chloride evolved during the reaction is vented from the reaction zone.

When the concentrated sulphuric acid employed in the process initially contains one molecular equivalent or more of water per mole of the polychlorinated phenol, the reaction may be carried to completion without adding more water. However, water is consumed in the reaction to form the chloranil product, and as the reaction mixture becomes more nearly anhydrous there is an increased tendency toward the formation of chlorosulphonic acid as a by-product. Accordingly, it often is advantageous to add small amounts of water from time to time during the reaction so as to maintain the sulphuric acid in the reaction mixture of a concentration between 92 and 99.5 per cent by weight. The precautions usual in admixing sulphuric acid and water should, of course, be observed in making such additions.

After completing the reaction, the mixture is cooled, usually to about 80° C. or lower, and is diluted by adding gradually and with stirring about two volumes of water. This dilution step is carried out with the care usually observed in diluting concentrated sulphuric acid. The chloranil product is then separated from the liquor, e. g., by filtration or decantation, and is washed with water and dried.

Instead of diluting the reacted mixture with water prior to separating the chloranil product, the latter may be separated directly from the crude reacted mixture, e. g., by filtration or decantation, and may thereafter be washed with water and dried. By separating the product in this way, a large part of the sulphuric acid may be recovered in a concentrated form suitable for re-employment in the reaction for the production of chloranil. During such operations of recycling the sulphuric acid in the process, the latter is from time to time treated with sufficient water to replace that consumed in the reaction for the formation of chloranil. Excessive accumulation of by-products in the reaction system may be avoided by discarding the sulphuric acid after recycling it several times in the process, or by discarding a portion of the sulphuric acid recovered in each cycle and replacing it with freshly added concentrated sulphuric acid.

By operating as herein disclosed, concentrated sulphuric acid may satisfactorily be used as a medium for the further chlorination of polychlorophenols to produce chloranil directly in high yield and in readily purifiable form.

The following examples describe certain ways in which the principle of the invention has been applied, but are not to be construed as limiting the scope of the invention.

EXAMPLE 1

Three series of experiments were carried out for the purpose of determining the effect of agitation and of changes in the reaction temperature and in the concentration of the sulphuric acid used as a reaction medium on the yield of chloranil from the chlorination of tetrachlorophenol in the presence of concentrated sulphuric acid. In each series of experiments the reaction condition being studied was varied from run to run, but all other reaction conditions were duplicated as nearly as possible in the different experiments.

Series A.—Effect of agitation

In each of two experiments, 116 grams (approximately 0.49 mole) of polychlorinated phenol containing 62.2 per cent by weight of chemically combined chlorine, i. e., having a chlorine content slightly higher than that of tetrachlorophenol and having approximately 1 per cent of aluminum chloride admixed therewith, was added in powdered form to 540 grams of sulphuric acid of 97.7 per cent concentration which had been heated to 125° C. While maintaining the mixture at said temperature, approximately 300 grams of chlorine (a several-fold excess over the amount theoretically required to convert the polychlorophenol to hexachlorophenol) was introduced over a period of 14 hours. The experiments differed in that one of the reaction mixtures was agitated only by the chlorine which was being introduced, whereas the other mixture was stirred vigorously with a mechanical stirrer during introduction of the chlorine. When introduction of the chlorine was completed, each reaction mixture was cooled to about 80° C., carefully diluted with approximately two volumes of water, and filtered to separate the chloranil product. The latter was washed with water, dried, and analyzed to determine its purity. The following table identifies the experiments by a statement as to whether the reaction was carried out with mechanical stirring. It gives the weight and per cent purity of the dried chloranil obtained in each experiment and states the per cent yield of the compound, chlorinal, based on the amount of polychlorinated phenol used as a starting material.

TABLE I

| Run No. | Mechanical stirring | Product | | |
|---|---|---|---|---|
| | | Grams | Per cent purity | Per cent yield of chloranil |
| 1 | No | 98.7 | 35.2 | 29.0 |
| 2 | Yes | 91.7 | 94.9 | 72.2 |

Series B.—Concentration of $H_2SO_4$

In each of a series of experiments, 116 grams (0.49 mole) of polychlorinated phenol having the same chlorine content and containing the same amount of aluminum chloride as that used as starting material in the experiments of Series A, was added in powdered form with stirring to 540 grams of aqueous sulphuric acid of the concentration stated in the following table, which sulphuric acid had been heated to 125° C. prior to the addition. A large excess, i. e. between 3.9 and 4.8 gram moles, of chlorine was introduced over a period of 14 hours while vigorously stirring the mixture and maintaining it at a temperature of 125° C. The chloranil product was then separated, dried and analyzed as in the experiments of Series A. Table II gives the initial concentration of the sulphuric acid employed in each experiment, states the weight and per cent purity of the chloranil product obtained and gives the per cent yield of the compound, chloranil, based on the polychlorophenol starting material.

TABLE II

| Run No. | Per cent conc. of $H_2SO_4$ | Product | | |
|---|---|---|---|---|
| | | Grams | Per cent purity | Per cent yield of chloranil |
| 1 | 80 | 115.2 | 26.0 | 25.0 |
| 2 | 85 | 116.5 | 35.0 | 34.0 |
| 3 | 90 | 108.7 | 71.8 | 65.0 |
| 4 | 92 | 106.4 | 78.3 | 69.5 |
| 5 | 93 | 100.0 | 82.4 | 69.0 |
| 6 | 96 | 86.3 | 96.4 | 69.3 |
| 7 | 97.7 | 91.7 | 94.9 | 72.2 |

Series C.—Effect of temperature

In each of a series of experiments, 116 grams (0.49 mole) of chlorinated phenol, of the same quality and containing the same amount of aluminum chloride as that used as starting material in the experiments of Series A, was added in powdered form with stirring to 540 grams of sulphuric acid of 97.7 per cent concentration, which acid had been heated to the temperature stated in Table III. A large excess, i. e., between 3.8 and 4.4 gram moles, of chlorine was introduced over a period of 14 hours while vigorously stirring the mixture and maintaining it at a substantially constant temperature. The chloranil product was then separated, dried and analyzed as in the experiments of Series A. Table III states the reaction temperature employed in each experiment, gives the weight and per cent purity of the chloranil product and states the per cent yield of the compound, chloranil, based on the polychlorophenol starting material.

TABLE III

| Run No. | Reaction temp., ° C. | Product Grams | Per cent purity | Per cent yield of chloranil |
|---|---|---|---|---|
| 1 | 85 | 106.4 | 81.5 | 72.2 |
| 2 | 95 | 100.3 | 97.3 | 81.5 |
| 3 | 100 | 102.2 | 97.4 | 83.0 |
| 4 | 115 | 96.7 | 97.5 | 78.3 |
| 5 | 125 | 90.6 | 97.8 | 73.7 |
| 6 | 135 | 73.0 | 98.0 | 59.7 |

EXAMPLE 2

This example illustrates the fact that it is important that the polychlorinated phenol, used as a starting material in the process, have a chlorine content corresponding to an average of more than 3 chlorine atoms per molecule. In each of four experiments 0.5 gram molecular equivalent of polychlorinated phenol, containing approximately 1 per cent by weight of aluminum chloride, was admixed with 532 grams of sulphuric acid of 98 per cent by weight concentration. The experiments differed as regards the chlorine content of the polychlorinated phenol used as a starting material, i. e., in one experiment the polychlorinated phenol starting material had a chlorine content corresponding to that of a mixture of 0.2 gram mole of dichloro-phenol and 0.3 gram mole of trichloro-phenol; in another it had the chlorine content of tetrachloro-phenol; in another it had a chlorine content corresponding to that of a mixture of 0.4 gram mole of tetrachlorophenol and 0.1 gram mole of pentachloro-phenol; and in the fourth experiment the poly-chlorophenol starting material was pentachloro-phenol. Each mixture of the polychlorinated phenol and sulphuric acid was heated to a temperature of from 100° to 110° C. and chlorine was introduced while vigorously stirring the mixture and maintaining it at temperatures within the range just stated. The introduction of chlorine was continued until the chlorination was substantially complete, as indicated by a sharp increase in the chlorine content of the vapors flowing from the reaction mixture. The mixture was then cooled to about 80° C., carefully diluted with about two volumes of water, and filtered to separate the solid chloranil product. The latter was washed thoroughly with water, dried, and analyzed to determine its purity. The following table identifies the polychlorinated phenol used as a starting material in each experiment, gives the weight and the per cent purity of the dried chloranil product, and gives the per cent yield of the compound, chloranil, based on the amount of polychlorinated phenol used as a starting material.

TABLE IV

| Run No. | Polychlorinated phenol Kind | Gm. moles | Product Grams | Per cent purity | Per cent yield of chloranil |
|---|---|---|---|---|---|
| 1 | Dichloro-phenol / Trichloro-phenol | 0.2 / 0.3 | 89.6 | 95.5 | 69.5 |
| 2 | Tetrachloro-phenol | 0.5 | 109.2 | 98.0 | 87.0 |
| 3 | Tetrachloro-phenol / Pentachloro-phenol | 0.4 / 0.1 | 112.3 | 97.5 | 89.0 |
| 4 | Pentachloro-phenol | 0.5 | 117.5 | 96.0 | 91.7 |

EXAMPLE 3

This example illustrates the fact that the reactions to produce chloranil according to the present method may be carried out satisfactorily in the absence of usual chlorination catalysts. In each of two experiments, 133 grams (0.5 mole) of pentachloro-phenol was admixed with 532 grams of sulphuric acid of 98 per cent concentration and chlorine was passed into the mixture while stirring the latter vigorously and heating it at temperatures between 110° and 120° C. The pentachloro-phenol used as a starting material in each experiment had been prepared by the reaction of chlorine with phenol in the presence of aluminum chloride in amount corresponding to 2 per cent of the weight of the phenol. The aluminum chloride used as a chlorination catalyst in preparing the pentachlorophenol was retained in the pentachloro-phenol used as a starting material in one of the experiments on the production of chloranil. However, the pentachloro-phenol used in the other experiment for the production of chloranil was carefully freed of the aluminum chloride before being employed for the purpose. Otherwise, the procedure employed in carrying out each reaction for the formation of chloranil and in separating the latter from the reaction mixture was similar to that described in Example 3. Table V identifies each experiment by stating whether aluminum chloride was present during the reaction for the formation of chloranil and it states the weight and per cent purity of the product and the per cent yield of chloranil, based on the pentachloro-phenol used as a starting material.

TABLE V

| Run No. | AlCl₃ present | Product Weight grams | Per cent purity | Per cent yield of chloranil |
|---|---|---|---|---|
| 1 | Yes | 116.2 | 92.5 | 87.4 |
| 2 | No | 111.8 | 97.7 | 88.7 |

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making chloranil, the steps which consist in admixing chlorinated phenol, having a chlorine content corresponding to an average of between 3 and 6 chlorine atoms per molecule, with sufficient aqueous sulphuric acid of at least 90 per cent concentration to form a mixture capable of readily being stirred, passing chlorine into the mixture while stirring and heating the latter at temperatures between 90° and 130° C., and continuing the introduction of chlorine until the chlorinated phenol is for the most part converted into chloranil.

2. In a method of making chloranil, the steps which consist in admixing chlorinated phenol, having a chlorine content corresponding to an average of between 3.5 and 5.5 atoms of chlorine per molecule, with sufficient aqueous sulphuric acid of at least 90 per cent concentration to form a mixture containing at least one molecular equivalent of water per mole of the chlorinated phenol, and passing chlorine into the mixture while stirring and heating the latter at temperatures between 90° and 130° C. until the chlorinated phenol is for the most part converted into chloranil.

3. In a method of making chloranil, the steps which consist in admixing chlorinated phenol, having a chlorine content corresponding to an average of between 3.5 and 5.5 chlorine atoms per molecule, and sufficient aqueous sulphuric acid of at least 90 per cent concentration to form a mixture capable of being readily stirred, passing chlorine into the mixture, while stirring and heating the latter at temperatures between 90° and 130° C. and adding water as required by the reaction in amount such that the water content of the reaction mixture does not exceed 10 per cent of the combined weight of the water and sulphuric acid, and continuing operation as just described until the chlorinated phenol is, for the most part, converted into chloranil.

4. The method, as described in claim 1, wherein the chlorinated phenol employed as a starting material has a chlorine content corresponding to an average of from 3.5 to 4.5 chloride atoms per molecule.

5. The method, as described in claim 1, wherein the chlorinated phenol employed as a starting material has a chlorine content corresponding to an average of from 3.5 to 4.5 chlorine atoms per molecule and the aqueous sulphuric acid employed as a starting material is of from 92 to 99 per cent concentration.

6. The method, as described in claim 1, wherein the polychlorinated phenol employed as a starting material has a chlorine content corresponding to an average of from 3.5 to 4.5 chlorine atoms per molecule, the aqueous sulphuric acid is initially of from 92 to 99 per cent concentration, and the reaction to form the chloranil is carried out at temperatures between 95° and 125° C.

7. The method, as described in claim 1, wherein the polychlorinated phenol employed as a starting material has a chlorine content corresponding to an average of from 3.5 to 4.5 chlorine atoms per molecule, the aqueous sulphuric acid is initially of from 92 to 99 per cent concentration, the reaction to form the chloranil is carried out at temperatures between 95° and 125° C., and the reacted mixture is diluted with water and filtered to separate the solid chloranil product.

8. The method, as described in claim 1, wherein the polychlorinated phenol employed as a starting material has a chlorine content corresponding to an average of from 3.5 to 4.5 chlorine atoms per molecule, the aqueous sulphuric acid is initially of from 92 to 99 per cent concentration, the reaction to form chloranil is carried out at temperatures between 95° and 125° C., and the solid chloranil product is separated from the reaction liquor to recover the sulphuric acid in a concentrated form suitable for re-employment in the reaction.

9. The method, as described in claim 2, wherein the chlorinated phenol employed as a starting material has a chlorine content corresponding to an average of from 3.5 to 4.5 chlorine atoms per molecule.

10. The method, as described in claim 2, wherein the chlorinated phenol employed as a starting material has a chlorine content corresponding to an average of from 3.5 to 4.5 chlorine atoms per molecule and the aqueous sulphuric acid employed as a starting material is of from 92 to 99 per cent concentration.

11. The method, as described in claim 2, wherein the polychlorinated phenol employed as a starting material has a chlorine content corresponding to an average of from 3.5 to 4.5 chlorine atoms per molecule, the aqueous sulphuric acid is initially of from 92 to 99 per cent concentration, and the reaction to form the chloranil is carried out at temperatures between 95° and 125° C.

12. The method, as described in claim 2, wherein the polychlorinated phenol employed as a starting material has a chlorine content corresponding to an average of from 3.5 to 4.5 chlorine atoms per molecule, the aqueous sulphuric acid is initially of from 92 to 99 per cent concentration, the reaction to form the chloranil is carried out at temperatures between 95° and 125° C., and the reacted mixture is diluted with water and filtered to separate the solid chloranil product.

13. The method, as described in claim 2, wherein the polychlorinated phenol employed as a starting material has a chlorine content corresponding to an average of from 3.5 to 4.5 chlorine atoms per molecule, the aqueous sulphuric acid is initially of from 92 to 99 per cent concentration, the reaction to form chloranil is carried out at temperatures between 95° and 125° C., and the solid chloranil product is separated from the reaction liquor to recover the sulphuric acid in a concentrated form suitable for re-employment in the reaction.

14. The method, as described in claim 3, wherein the chlorinated phenol employed as a starting material has a chlorine content corresponding to an average of from 3.5 to 4.5 chlorine atoms per molecule.

15. The method, as described in claim 3, wherein the chlorinated phenol employed as a starting material has a chlorine content corresponding to an average of from 3.5 to 4.5 chlorine atoms per molecule and the aqueous sulphuric acid employed as a starting material is of from 92 to 99 per cent concentration.

16. The method, as described in claim 3, wherein the polychlorinated phenol employed as a starting material has a chlorine content corresponding to an average of from 3.5 to 4.5 chlorine atoms per molecule, the aqueous sulphuric acid is initially of from 92 to 99 per cent concentration, and the reaction to form the chloranil is carried out at temperatures between 95° and 125° C.

17. The method, as described in claim 3, wherein the polychlorinated phenol employed as a starting material has a chlorine content corresponding to an average of from 3.5 to 4.5 chlorine atoms per molecule, the aqueous sulphuric acid is initially of from 92 to 99 per cent concentration, the reaction to form the chloranil is carried out at temperatures between 95° and 125° C., and the reacted mixture is diluted with water and filtered to separate the solid chloranil product.

18. The method, as described in claim 3, wherein the polychlorinated phenol employed as a starting material has a chlorine content corresponding to an average of from 3.5 to 4.5 chlorine atoms per molecule, the aqueous sulphuric acid is initially of from 92 to 99 per cent concentration, the reaction to form chloranil is carried out at temperatures between 95° and 125° C., and the solid chloranil product is separated from the reaction liquor to recover the sulphuric acid in a concentrated form suitable for re-employment in the reaction.

FRANCIS N. ALQUIST.
CLAUDE H. GROOM, Jr.
FREDERICK H. HANEY.